US00RE47680E

(19) United States
(12) Reissued Patent
Chiang et al.

(10) Patent Number: US RE47,680 E
(45) Date of Reissued Patent: Nov. 5, 2019

(54) MEDICAL AIR MATTRESS

(71) Applicant: Picard Healthcare Technology (Dongguan) Co. Ltd.

(72) Inventors: Kuang-Neng Chiang, Taipei (TW); Hsui-Lun Liang, Taipei (TW)

(73) Assignee: Picard Healthcare Technology (Dongguan) Co. Ltd., Dongguan (CN)

(21) Appl. No.: 15/674,199

(22) Filed: Aug. 10, 2017

Related U.S. Patent Documents

Reissue of:
(64) Patent No.: 9,101,224
Issued: Aug. 11, 2015
Appl. No.: 13/158,198
Filed: Jun. 10, 2011

(51) Int. Cl.

| | |
|---|---|
| ***A47C 27/10*** | (2006.01) |
| ***A47C 21/08*** | (2006.01) |
| ***A61G 7/05*** | (2006.01) |
| ***A61G 7/057*** | (2006.01) |
| ***A61H 23/02*** | (2006.01) |
| ***A47C 27/08*** | (2006.01) |

(52) U.S. Cl.
CPC ..... *A47C 27/10* (2013.01); *A47C 21/08* (2013.01); *A47C 27/081* (2013.01); *A61G 7/0525* (2013.01); *A61G 7/05776* (2013.01); *A61H 23/02* (2013.01); *A47C 27/08* (2013.01); *A61H 2201/0146* (2013.01); *A61H 2201/5002* (2013.01); *A61H 2203/0456* (2013.01); *A61H 2205/04* (2013.01); *A61H 2205/081* (2013.01); *A61H 2205/083* (2013.01); *A61H 2205/086* (2013.01); *A61H 2205/108* (2013.01)

(58) Field of Classification Search
CPC .... A47C 27/10; A47C 27/081; A61G 7/0525; A61G 7/05776; A61G 7/05769; A61G 7/0792
USPC .... 5/421, 424, 425, 706, 708, 710, 713, 715
See application file for complete search history.

(56) References Cited

U.S. PATENT DOCUMENTS

| | | | |
|---|---|---|---|
| 2,998,817 | A | 9/1965 | Armstrong |
| 3,653,083 | A | 4/1972 | Lapidus |
| 3,678,520 | A | 7/1972 | Evans |

(Continued)

FOREIGN PATENT DOCUMENTS

| | | |
|---|---|---|
| CN | 2198886 | 5/1995 |
| CN | 2580943 | 10/2003 |

(Continued)

OTHER PUBLICATIONS

European Search Authority, Extended European Search Report in related application No. 17205768.9 (dated Mar. 12, 2018).

*Primary Examiner* — Cary E Wehner
(74) *Attorney, Agent, or Firm* — Fay Sharpe LLP

(57) ABSTRACT

A medical air mattress has a mattress body, a lower bedspread, an upper bedspread and a guardrail unit. The mattress body is formed by multiple air cells parallel arranged in an air cell row. The upper bedspread covers the mattress body and has two guardrail sleeves formed on the upper bedspread. The guardrail unit has multiple guardrail air cells mounted respectively in the guardrail sleeves. Since the guardrail sleeves are formed on the upper bedspread, the guardrail sleeves from each opposite side of the upper bedspread will draw each other to maintain the guardrail sleeves in position when pressed. Therefore, the guardrail sleeves do not fall down when pressed to remain providing optimal protection purpose.

82 Claims, 15 Drawing Sheets

(56) References Cited

U.S. PATENT DOCUMENTS

| | | | | |
|---|---|---|---|---|
| 4,193,149 | A | 3/1980 | Welch | |
| 4,617,690 | A | 10/1986 | Grebe | |
| 5,421,044 | A * | 6/1995 | Steensen | A47C 27/082 5/710 |
| 5,588,167 | A | 12/1996 | Pahno et al. | |
| 5,594,962 | A | 1/1997 | Bogdanoff | |
| 5,611,096 | A | 3/1997 | Bartlett et al. | A61G 7/001 5/424 |
| 5,647,079 | A | 7/1997 | Hakamium et al. | |
| 6,085,372 | A | 7/2000 | James et al. | A61G 7/001 5/713 |
| 6,119,292 | A | 9/2000 | Haas | A61G 7/001 5/713 |
| 6,353,950 | B1 | 3/2002 | Bartlett et al. | |
| 6,370,716 | B1 * | 4/2002 | Wilkinson | A61G 5/1043 297/314 |
| 6,467,111 | B1 | 10/2002 | Vrzalik et al. | |
| 6,523,198 | B1 | 2/2003 | Temple | |
| 7,165,280 | B2 | 1/2007 | Wang | |
| 7,418,751 | B1 | 9/2008 | Bartlett et al. | |
| 9,566,202 | B2 | 2/2017 | Chiang et al. | |
| 10,143,609 | B2 | 12/2018 | Chiang et al. | |
| 10,172,754 | B2 | 1/2019 | Chiang et al. | |
| 2002/0170117 | A1 | 11/2002 | Flick et al. | |
| 2002/0194677 | A1 | 12/2002 | Hayes | |
| 2007/0094805 | A1 | 5/2007 | Davis | |
| 2007/0143928 | A1 | 6/2007 | Biggie et al. | |
| 2008/0178392 | A1 | 7/2008 | Chu | |
| 2009/0064418 | A1 | 3/2009 | Genaro | |
| 2010/0325796 | A1 | 12/2010 | Lachenbruch et al. | |
| 2012/0011651 | A1 * | 1/2012 | Moss | A47C 21/08 5/424 |
| 2012/0311783 | A1 | 12/2012 | Chiang et al. | |

FOREIGN PATENT DOCUMENTS

| | | | |
|---|---|---|---|
| CN | 2580943 | Y | 10/2003 |
| CN | 2601648 | | 2/2004 |
| CN | 2601648 | Y | 2/2004 |
| CN | 2726583 | | 9/2005 |
| CN | 2726583 | Y | 9/2005 |
| CN | 2850598 | | 12/2006 |
| CN | 2850598 | Y | 12/2006 |
| CN | 2894675 | | 5/2007 |
| CN | 2894675 | Y | 5/2007 |
| CN | 2920216 | | 7/2007 |
| CN | 2920216 | Y | 7/2007 |
| CN | 201019949 | | 2/2008 |
| CN | 201049031 | | 4/2008 |
| CN | 201049031 | Y | 4/2008 |
| CN | 201135566 | | 10/2008 |
| CN | 102525768 | | 7/2012 |
| CN | 103340724 | | 10/2013 |
| DE | 69801817 | | 4/2002 |
| GB | 2469540 | | 10/2010 |
| JP | 05228180 | | 9/1993 |
| JP | 06007733 | U | 2/1994 |
| JP | 07116199 | | 5/1995 |
| JP | 2001516241 | | 9/2001 |
| JP | 2002136560 | | 5/2002 |
| JP | 2007159981 | | 6/2007 |
| JP | 3168324 | U | 5/2011 |
| JP | 6050338 | | 12/2016 |
| RU | 2014101149 | | 7/2015 |
| TW | 545240 | | 8/2003 |
| TW | 552931 | | 9/2003 |
| TW | 574918 | | 2/2004 |
| TW | M248432 | | 11/2004 |
| TW | 201231034 | | 8/2012 |
| TW | 201231035 | | 8/2012 |
| WO | 0215835 | | 2/2002 |
| WO | 0238099 | | 5/2002 |

* cited by examiner

MEDICAL AIR MATTRESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a medical air mattress, especially to a medical air mattress for anti-decubitus purposes.

2. Description of the Prior Arts

For patients who have physical difficulties with mobility or bedfast. Patients lying on a mattress over a long period of time are susceptible to develop decubitus ulcers on multiple areas of body due to continuous pressure. In order to minimize or eliminate the development of decubitus ulcers caretakers must turn patients' body over or move patient to alternate the areas of pressure on the body. The conventional medical air mattress was developed to assist in the manual movement of and alternating pressure areas on the patient using multiple odd and even cells alternatively inflated to generate wave motion for changing the contact areas of the patient's body. The conventional medical air mattress has the following inadequacies.

1. Because the patients lying on the conventional air mattress have difficulty with mobility or bedfast, the protective apparatus around the conventional air mattress is important to keep the patient from falling off of the mattress. Hospital beds, which a medical mattress is used on, are equipped with guardrails; which at times can prohibit medical staff from taking care of the patients lying on the hospital beds and cannot always be in optimal position for patient protection. Many patients require the continued therapy of a medical air mattress in their homes. The medical air mattress is also required to assist caretakers move patient with minimal manual labor. In many cases the home is not equipped with guardrails on the bed that the medical air mattress is being used. The conventional medical air mattress has air filled guardrails to protect patients and to assist caretakers, who can easily press down the air guardrails. Such guardrails cannot be inflated or deflated independently. If the patient accidentally compresses either air guardrail, such air guardrails will slant outward and cannot protect the patient anymore, causing the opportunity for the patient to fall from mattress. Such air guardrails have no connection with the upper bedspreads, only being connected to the lower bedspreads restrict the ability to have mutual-drawing power to each other from two-side on the upper bedspreads.

2. To assist patients in turning over, two inclined cells are mounted under the body air cells. When the patients need to turn over, one of the inclined cells inflates to tilt the conventional air mattress. This design offers only one inclined angle. Patients with varying disabilities will require different inclined positions, which are decided by physicians or patient discomfort. In the event that the patient requires a different angle than that offered by the conventional air mattress caretakers may use non-recommended accessories or the therapy cannot be provided. Either of these options put the patient at risk of injury.

The present invention provides a medical air mattress to mitigate or obviate the aforementioned inadequacies.

SUMMARY OF THE INVENTION

The main objective of the present invention is to provide a medical air mattress that will have mutual-drawing guardrail sleeves to keep the guardrail sleeves from tilting when being pressed. The medical air mattress has a mattress body, an upper bedspread and a guardrail unit. The mattress body is formed by multiple air cells parallelly arranged in an air cell row. The upper bedspread covers the mattress body and has guardrail sleeves on two-side formed on the top of the upper bedspread. The guardrail unit has multiple guardrail air cells mounted respectively in the guardrail sleeves. The guardrail sleeves are formed on the upper bedspread, the upper bedspread and the guardrail sleeves will draw each other on two-side to ensure the guardrail sleeves remain in position when pressed. Therefore, the guardrail sleeves will not fall down when pressed and continue to provide optimal protection for the patient as its intended purpose.

Other objectives, advantages and novel features of the invention will become more apparent from the following detailed description when reviewed in conjunction with the accompanying drawings.

DETAILED DESCRIPTION OF THE PREFERRED EMBODIMENTS

Figure 1:
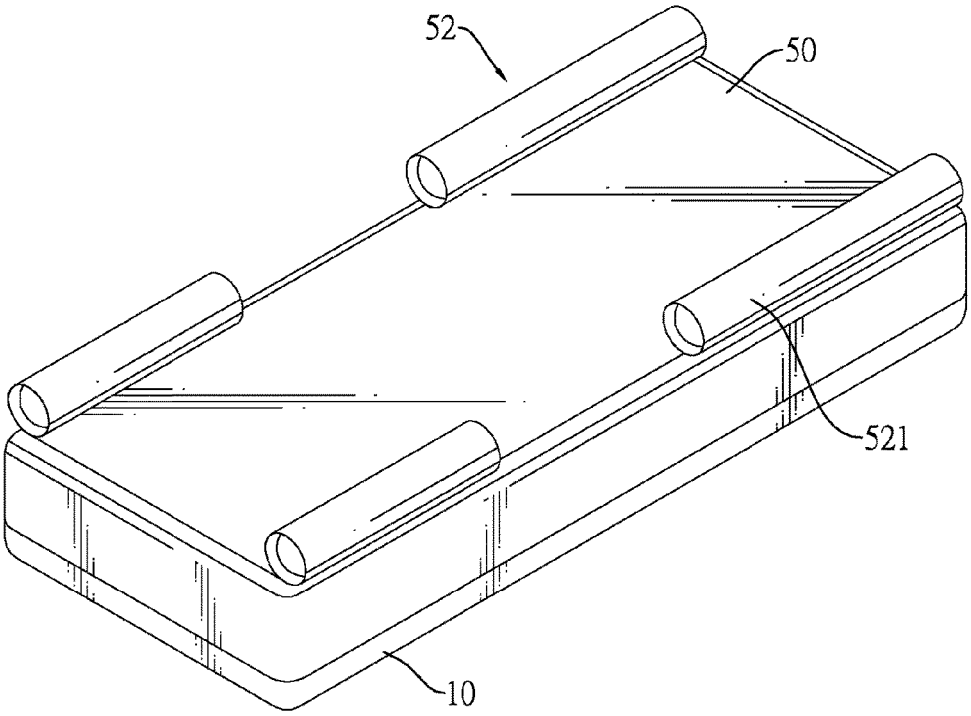
FIG. 1 is a perspective view of a medical air mattress in accordance with the present invention.
Figure 2:
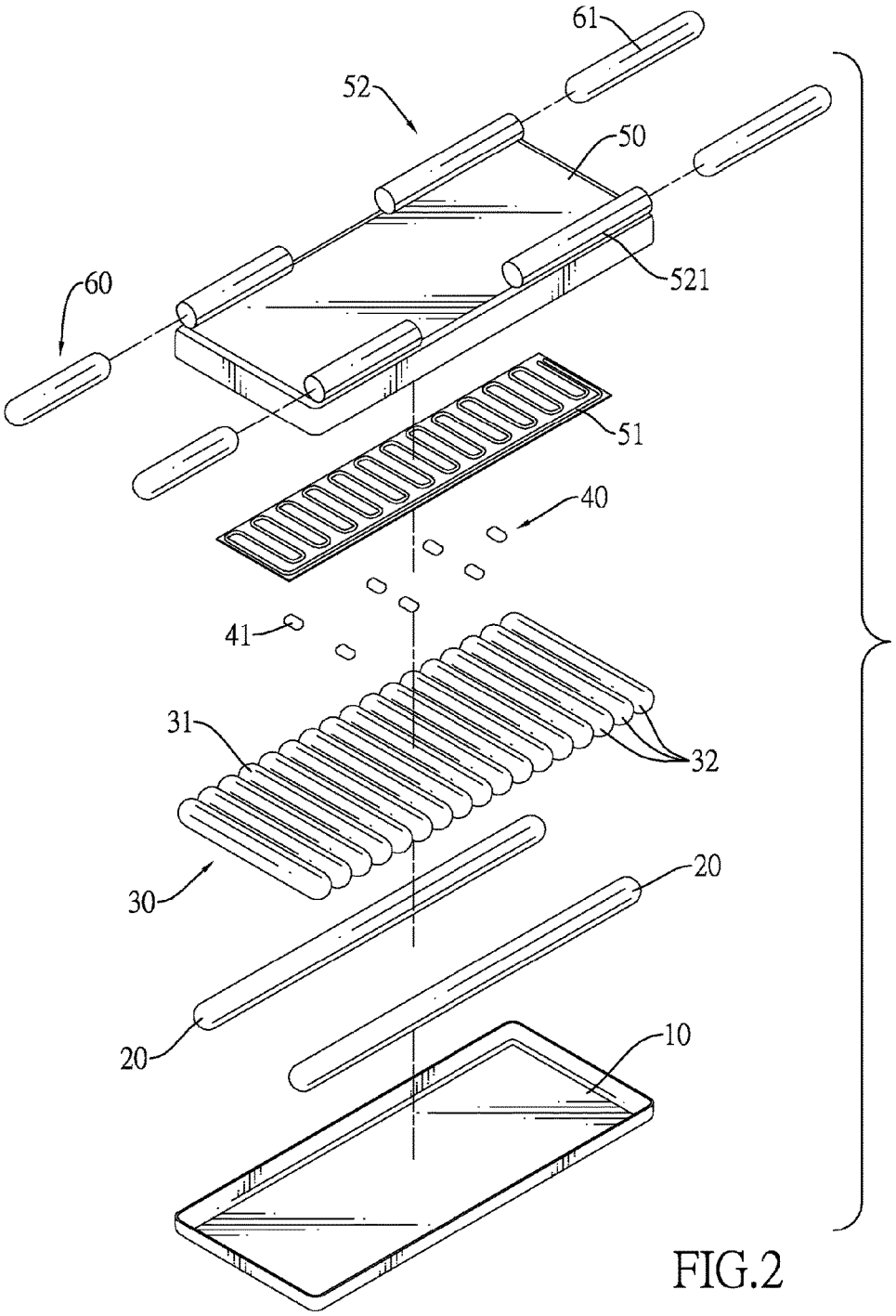
FIG. 2 is an exploded perspective view of the medical air mattress in FIG. 1.

With reference to FIGS. 1 and 2, a first embodiment of a medical air mattress in accordance with the present invention comprises a lower bedspread 10, two inclined air cells 20, a mattress body 30, an upper bedspread 50 and a guardrail unit 60.

The inclined air cells 20 are mounted longitudinally on the lower bedspread 10; respectively near two sides of the lower bedspread 10 and are parallel to each other.

The mattress body 30 is mounted on the lower bedspread 10, which is mounted across the inclined air cells 20 comprising of multiple body air cells 31 and multiple head air cells 32. In a preferred embodiment, the mattress body 30 comprises three head air cells 32. Each body air cell 31 and each head air cell 32 are tubular and respectively uniform in diameter. The head air cells 32 have the same diameter with the body air cells 31. The body air cells 31 and the head air cells 32 are parallel to each other and are arranged in a row to form an air cell row. The head air cells 32 are arranged at a head end in the air cell row, i.e. the head air cells 32 arranged at first to third in the air cell row. The body air cells 31 are arranged at fourth to seventeenth in the air cell row.

The upper bedspread 50 covers the mattress body 30 and is connected securely to the lower bedspread 10. A heat unit 51 is installed right under the upper bedspread 50 and above mattress body 30 for heating. The heat unit 51 may be carbon fiber electrothermal sheet. The upper bedspread 50 has guardrail sleeves 52. The guardrail sleeves 52 are formed parallel on two-side of the upper bedspread 50 and are respectively formed adjacent to the edges of two sides of the upper bedspread 50. In a preferred embodiment, the guardrail sleeves 52 are stitched on the upper bedspread 50. Each guardrail sleeve 52 has at least one sleeve body 521. In a preferred embodiment, each guardrail sleeve 52 has two sleeve bodies 521 formed separately and aligning with and coaxial to each other.

The medical air mattress as described further comprises a massage unit 40 mounted on the mattress body 30. The massage unit 40 comprises multiple micro vibrators 41 to massage the patients lying on the medical air mattress as described. Those micro vibrators 41 distribute massage separately and respectively to patient's neck, back, waist, thighs and so on.

The guardrail air unit 60 is mounted in the guardrail sleeves 52 and comprises multiple guardrail air cells 61. The guardrail air cells 61 are mounted respectively in the sleeve bodies 521 of the guardrail sleeve 52.

Figure 3:
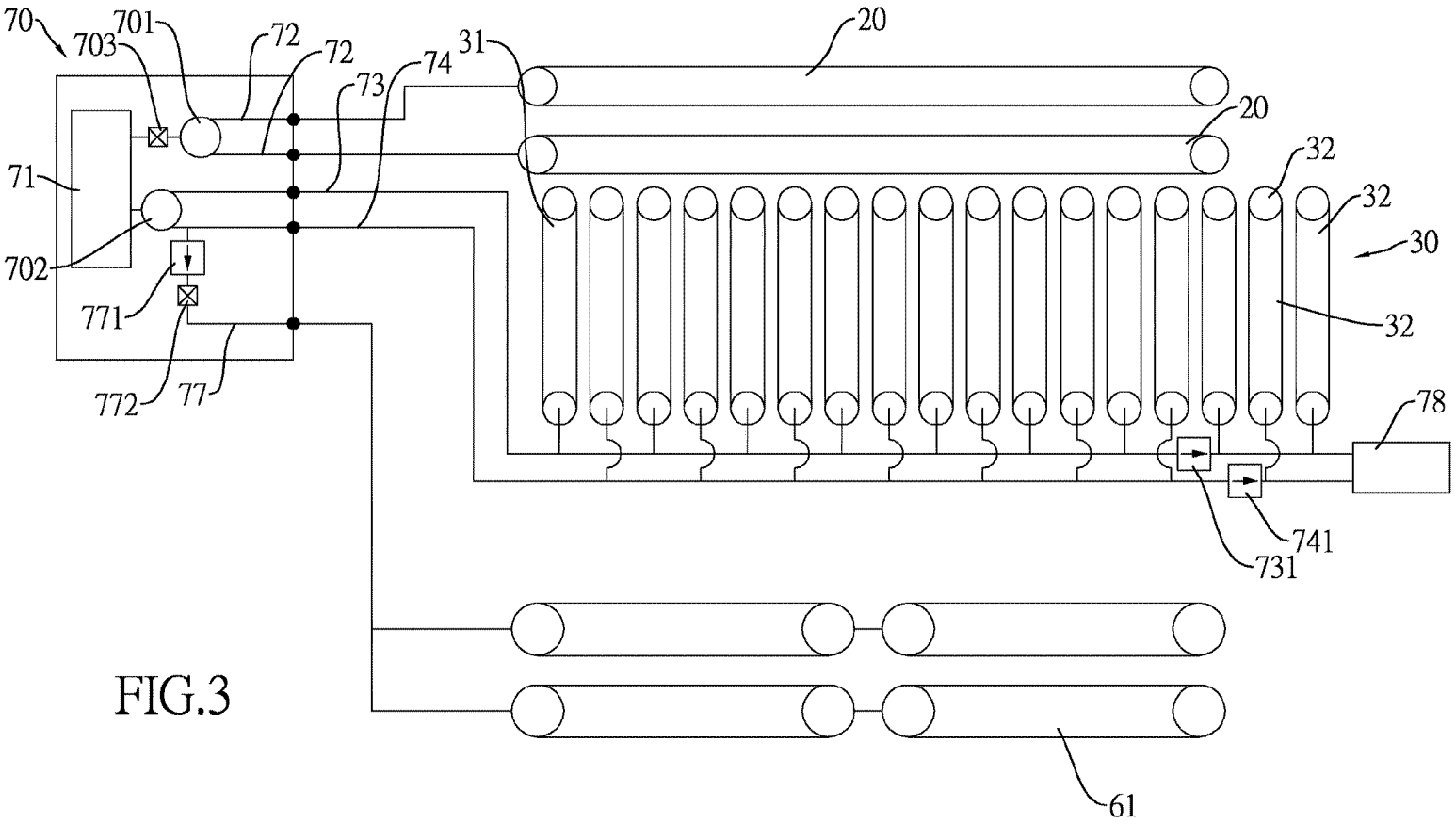
FIG. 3 is a pipeline diagram of the medical air mattress in FIG. 1.

With reference to FIG. 3, the medical air mattress as described comprises a pumping assembly 70. The pumping assembly 70 is connected to and selectively inflates the inclined air cells 20, the body air cells 31, the head air cells 32 and the guardrail air cells 61. In a preferred embodiment, the pumping assembly 70 comprises a pump 71, an inclined pipeline 72, an odd body pipeline 73, an even body pipeline 74, a guardrail pipeline 77 and a rapidly releasing valve 78. The inclined pipeline 72 connects the pump 71 with the inclined air cells 20. The odd body pipeline 73 connects the pump 71 with the body air cells 31 and the head air cells 32 at odd rows of the air cell rows. The even body pipeline 74 connects the pump 71 with the body air cells 31 and the head air cells 32 at even rows of the air cell rows. The guardrail pipeline 77 connects the pump 71 with the guardrail air cells 61. The rapidly releasing valve 78 is connected to the odd body pipeline 73 and the even body pipeline 74 for rapidly releasing the air in the mattress body 30 for emergency uses. For example, when the patient needs C.P.R., the medical air mattress as described needs not be removed or the patient needs not be moved since the mattress body 30 is rapidly deflated to rescue the patient immediately.

In a preferred embodiment, the pump 71 is connected to an inclined alternating-valve 701 and a body alternating-valve 702. An inclined solenoid valve 703 is also connected between the inclined alternating-valve 701 and the pump 71. The inclined alternating-valve 701 is connected between the inclined solenoid valve 703 and the inclined pipeline 72. The body alternating-valve 702 is connected between the pump 71 with the body pipelines 73, 74 and the guardrail pipeline 77. The guardrail pipeline 77 is connected to the body alternating-valve 702 via a guardrail solenoid valve 772. The odd body pipeline 73 is connected to the head air cells 32 via a check valve 731. The even body pipeline 74 is connected to the head air cells 32 via a check valve 741. The body alternating-valve 702 is connected to the guardrail solenoid valve 772 via a check valve 771.

Figure 3A:
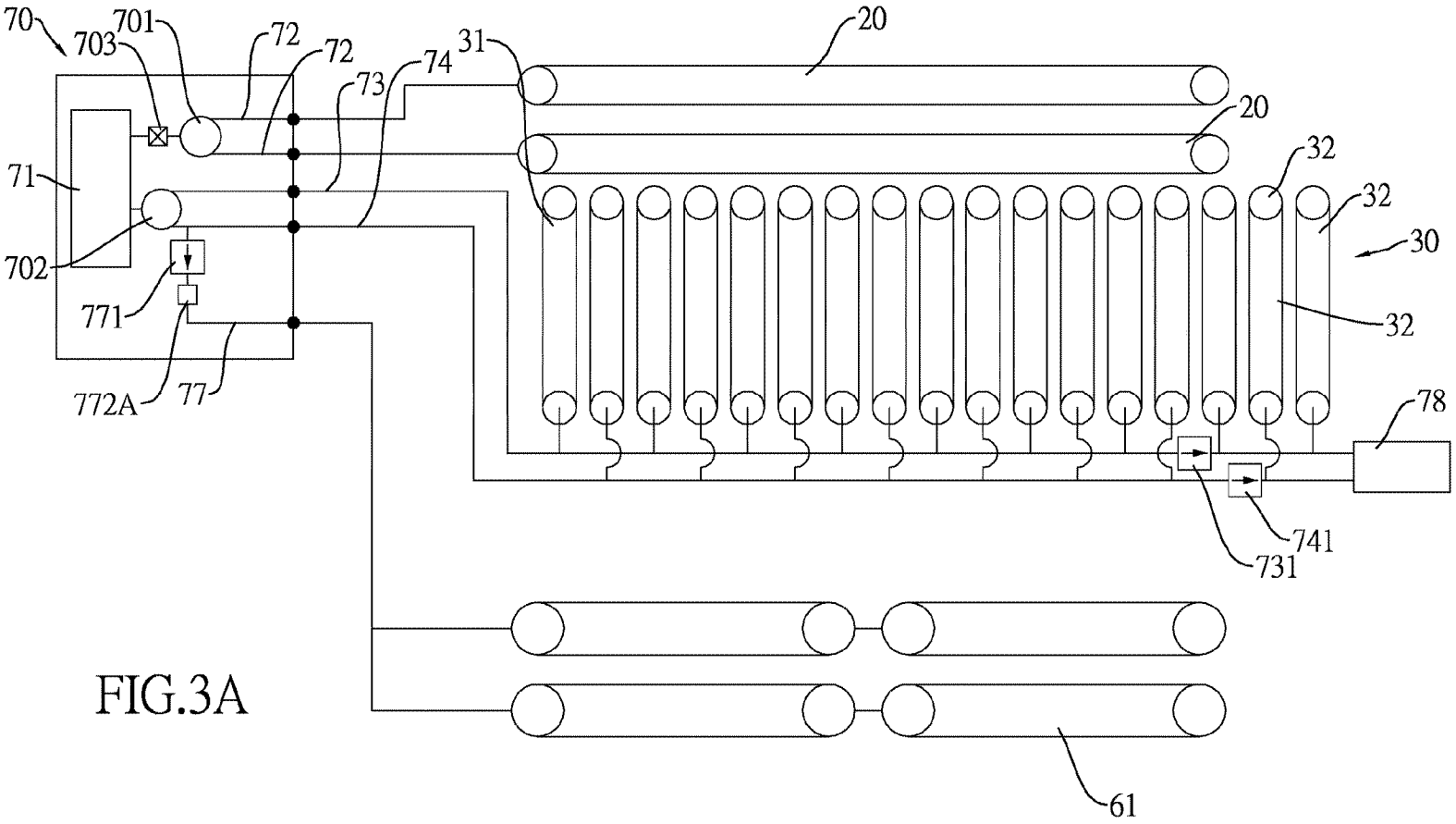
FIG. 3A is a pipeline diagram of the medical air mattress in FIG. 1.

With reference to FIG. 3A, the deflating unit for the guardrail air cells 61 may be a manual alternating device 772A. The user controls the manual alternating device 772A to stop inflating the guardrail air cells 61. The manual alternating device 772A has an air inlet, an inflating opening, a deflating opening, a linking rod, two airflow washers, an air restricting washer and a resilient element. The air inlet is connected to the body alternating-valve 702. The inflating opening is connected to the guardrail air cells 61 through the guardrail pipeline 77. The deflating opening communicates with the exterior. When inflating, the deflating opening is closed and the inflating opening is opened to inflate the guardrail air cells 61. When deflating, the resilient element, the linking rod and the air-resisting washer are manually moved to close the inflating opening and to open the deflating opening. Then the guardrail air cells 61 are deflated independently.

When the medical air mattress as described is operated, the pump 71, the alternating-valves and the solenoid valves are actuated to inflate the air cells and to adjust the inflating. The inflating and the deflating operations are described detailedly below.

For guardrail air cells 61, when the pump 71 is operated, the guardrail air cells 61 are inflated to expand the guardrail sleeves 52 to provide side protections on the upper bedspread 50. When the patients lying on the upper bedspread 50 accidentally press on the guardrail sleeves 52, the guardrail sleeves 52 on both sides are drawn by each other since the guardrail sleeves 52 are formed on two-side of the upper bedspread 50. The drawing force keeps the guardrail sleeves 52 maintaining their shapes even being pressed. Therefore, the guardrail sleeves 52 are kept in position to protect the patients lying on the medical air mattress as described. Further, the check valve 771 keeps the air from back flowing when the body alternating-valve 702 is operated.

For the mattress body, when the pump 71 is operated, user may select different modes.

Figure 4:
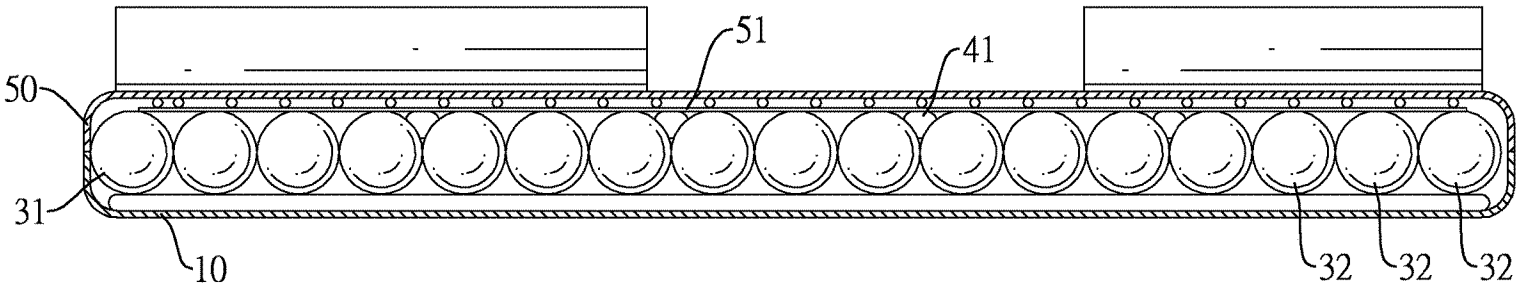
FIG. 4 is an operational side view in partial section of the medical air mattress in FIG. 1, showing the body air cells all inflated.

1. Full Inflating Mode:

With reference to FIGS. 3 and 4, the pump 71 is operated to inflate the body air cells 31 and the head air cells 32.

Figure 5:
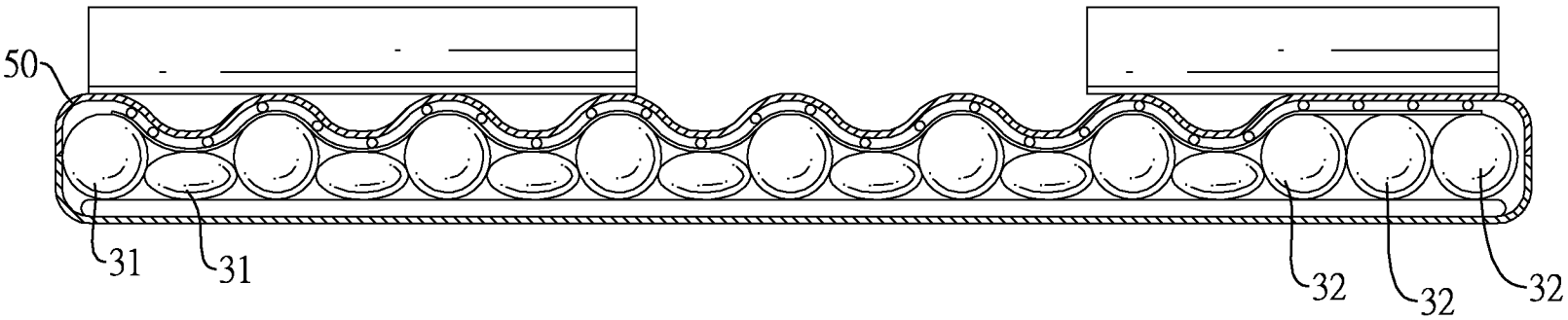
FIG. 5 is an operational side view in partial section of the medical air mattress in FIG. 1, showing the odd body air cells inflated.
Figure 6:
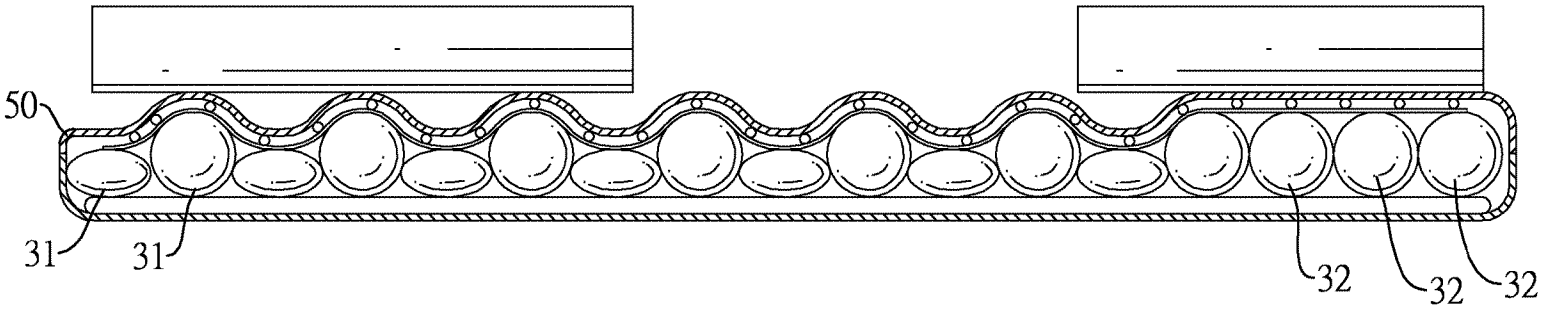
FIG. 6 is an operational side view in partial section of the medical air mattress in FIG. 1, showing the even body air cells inflated.

2. Alternating Inflating Mode:

With reference to FIGS. 3, 5 and 6, the pump 71 is operated and inflates the body air cells 31 at odd or even rows of the air cell rows alternately. In a preferred embodiment, the body alternating-valve 702 accomplishes the alternating inflating. The pump 71 supplies air into the body alternating-valve 702. The body alternating-valve 702 alternately supplies air into odd or even body pipelines 73, 74. When the odd body pipeline 73 is inflated, the body air cells 31 at odd rows of the air cell rows are inflated and the body air cells 31 at even rows of the air cell rows are deflated as shown in FIG. 5. When the even body pipeline 74 is inflated, the body air cells 31 at even rows of the air cell rows are inflated and the body air cells 31 at odd rows of the air cell rows are deflated as shown in FIG. 6. Moreover, since the check valves 731, 741 are connected between the head air cells 32 with the odd and even body pipelines 73, 74, the head air cells 32 are kept inflated without deflating by the body alternating-valve 702 to support the patient's head stably.

Figure 7:
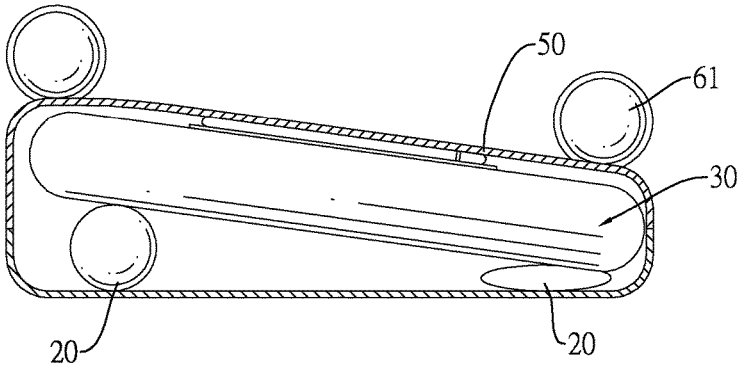
FIG. 7 is an operational end view in partial section of the medical air mattress in FIG. 1, showing the left side inclined air cell inflated.

For the inclined air cells 20 as shown in FIGS. 3 and 7, the pump 71 is operated to inflate one of the inclined air cells 20 to tilt one side of the medical air mattress as described so that the patient is to be turned over easily. In a preferred embodiment, the inclined alternating-valve 701 is operated to inflate the inclined air cells 20 alternately.

Figure 8:
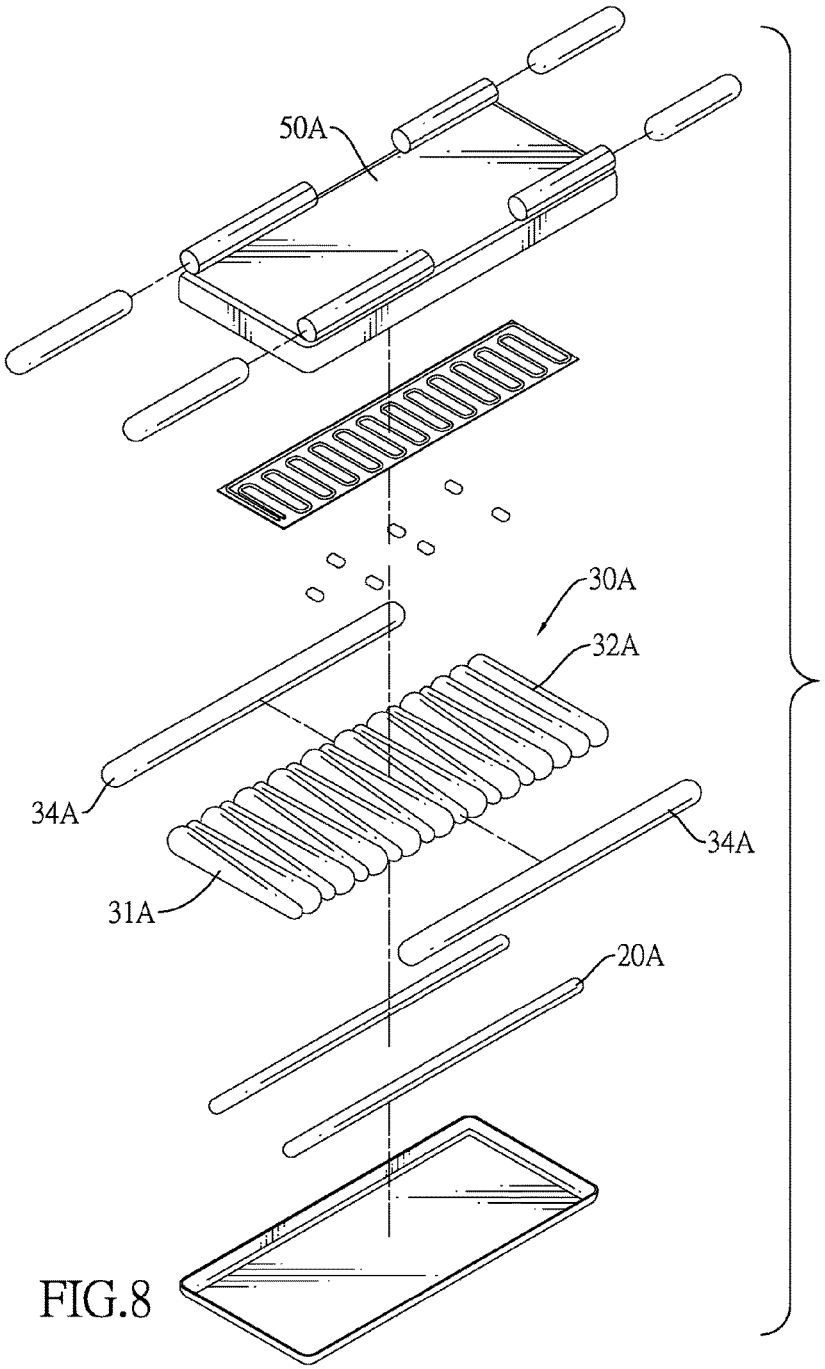
FIG. 8 is an exploded perspective view of another embodiment of a medical air mattress in accordance with the present invention.
Figure 9:
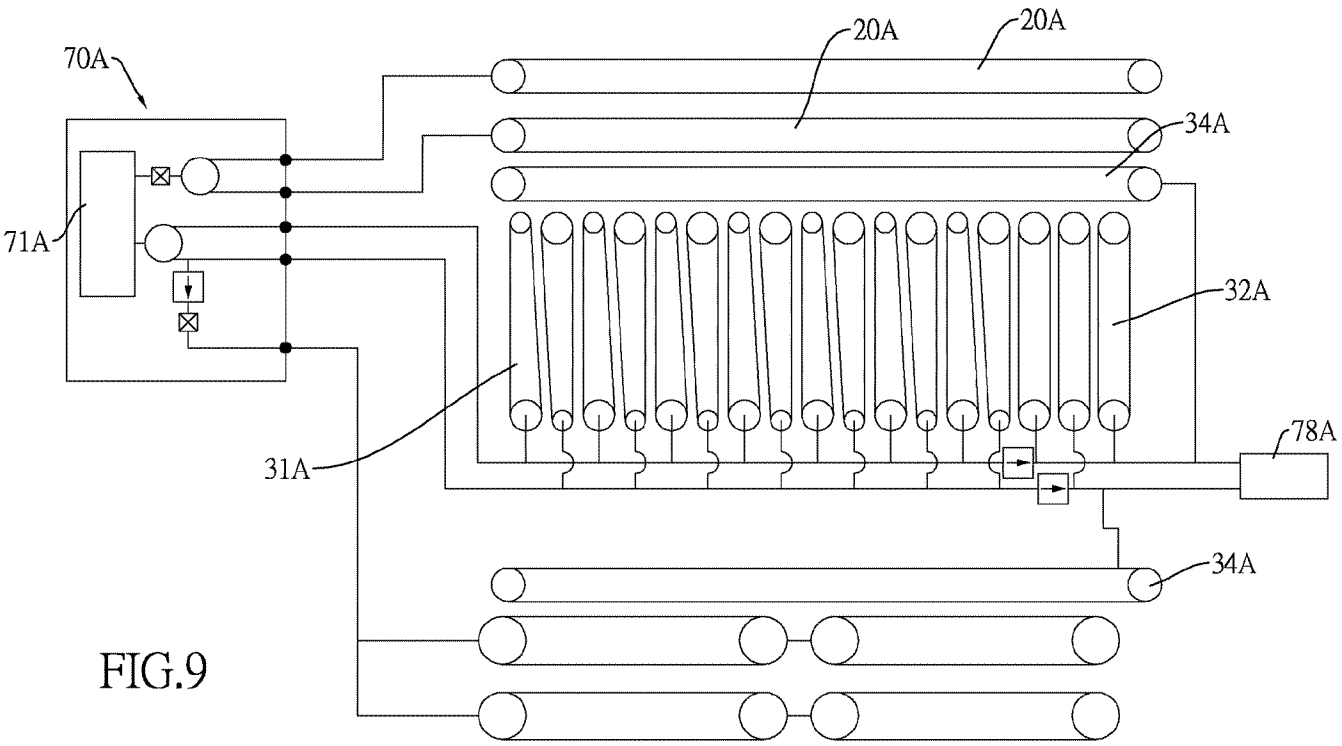
FIG. 9 is a pipeline diagram of the medical air mattress in FIG. 8.

With reference to FIGS. 8 and 9, a second embodiment of a medical air mattress in accordance with the present invention is similar to the first embodiment as described, but the body air cells 31A of the body mattress 30A are conical. Each body air cell 31A gradually tapers in diameter from one end to the other end so that each body air cell 31A has a wide end and a narrow end. The body air cells 31A are arranged with wide ends adjacent to the narrow ends. For example, the wide ends of the body air cells 31A at odd rows of the air cell rows align with the narrow ends of the body air cells 31A at even rows of the air cell rows. The medical air mattress as described further comprises two offset air cells 34A mounted longitudinally and mounted respectively on two sides of the mattress body 30A to enlarge the area of the medical air mattress and to support the upper bedspread 50A. The offset air cells 34A are connected to the pipeline connecting to the head air cells 32A and are also protected by the check valves 731, 741 to maintain inflating.

When the medical air mattress as described is operated, the pump 71A, the alternating-valves and the solenoid valves are also actuated to inflate the air cells and to alternatively adjust the inflating. Since most operations are discussed above, only different operations are described below for the second embodiment of the medical air mattress.

For mattress body 30A, when the pump 71A is operated, user may select different modes.

1. Full Inflating Mode:

The pump 71A is operated to inflate all the body air cells 31A and the head air cells 32A.

Figure 10:
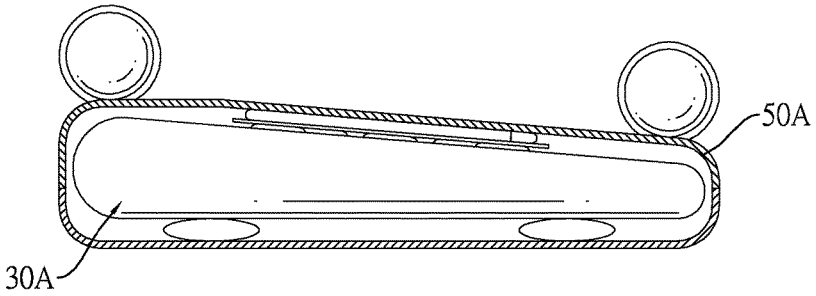
FIG. 10 is an operational end view in partial section of the medical air mattress in FIG. 8, showing the odd body air cells inflated.
Figure 11:
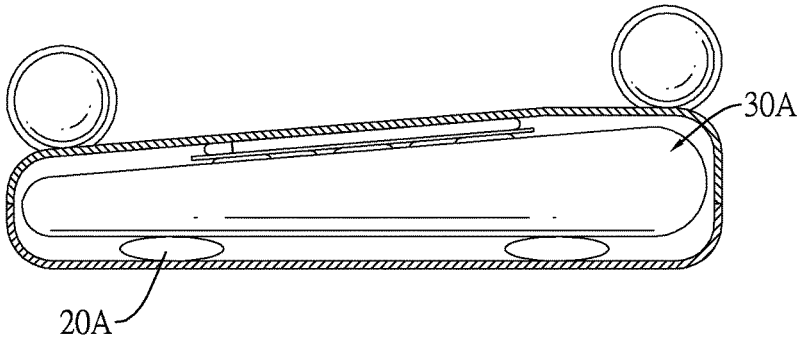
FIG. 11 is an operational end view in partial section of the medical air mattress in FIG. 8, showing the even body air cells inflated.

2. Alternating Inflating Mode:

With reference to FIGS. 9 to 11, the pump 71A is operated and inflates the body air cells 31A at odd or even rows of the air cell rows alternatively. When the body air cells 31A at odd rows of the air cell rows are inflated, the body air cells 31A at even rows of the air cell rows are deflated as shown in FIG. 10. Since the body air cells 31A at odd rows of the air cell rows have wide left ends and narrow right ends, the mattress body 30A is higher at left side and lower at right side to tilt the patient rightward. When the body air cells 31A at even rows of the air cell rows are inflated, the body air cells 31A at odd rows of the air cell rows are deflated as shown in FIG. 11. Since the body air cells 31A at even rows of the air cell rows have wide right ends and narrow left ends, the mattress body 30A is higher at right side and lower at left side to tilt the patient leftward. Therefore, the alternating inflating of the body air cells 31A not only provides the alternative wave of the mattress body 30A, but also tilts the patient at certain inclined angle. In this embodiment, the body air cells 31A provides inclined angle at, said 20 degrees.

With reference to FIGS. 9 and 12 to 14, the alternating inflating of the body air cells 31A associated with the inclined air cells 20A provides more different inclined angles.

Figure 12:
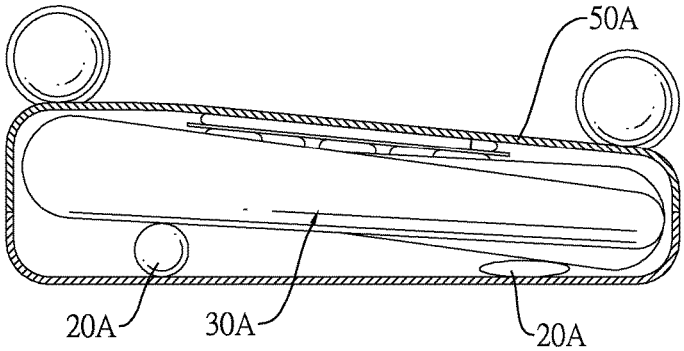
FIG. 12 is an operational end view in partial section of the medical air mattress in FIG. 8, showing the left side inclined air cell and all body air cells inflated.
Figure 13:
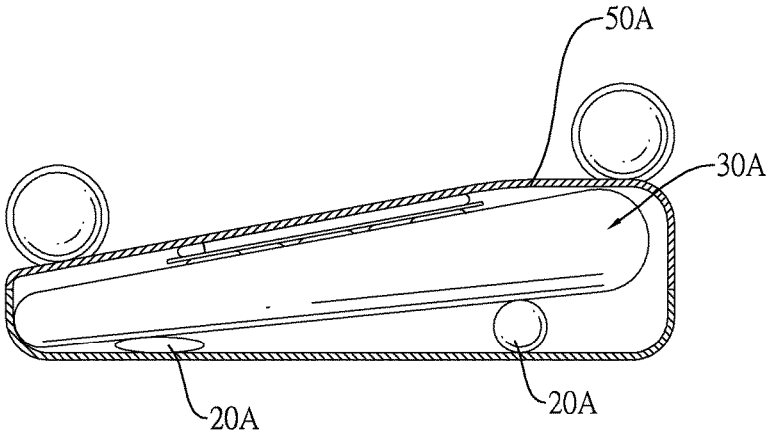
FIG. 13 is an operational end view in partial section of the medical air mattress in FIG. 8, showing the right side inclined air cell and even body air cells inflated.
Figure 14:
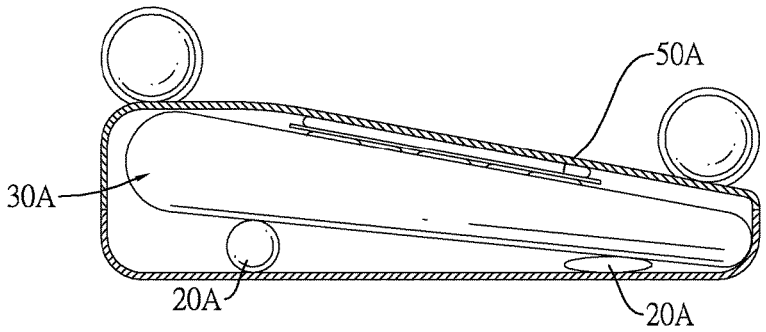
FIG. 14 is an operational end view in partial section of the medical air mattress in FIG. 8, showing the left side inclined air cell and odd body air cells inflated.

When all of the body air cells 31A are inflated and one of the inclined air cells 20A is inflated as shown in FIG. 12, the top surface of the upper bedspread 50A is tilted to one side to provide an inclined angle at, said 10 degrees.

When the body air cells 31A at even rows of the air cell rows are inflated and the body air cells 31A at odd rows of the air cell rows are deflated, the inclined air cell 20A at right side is also simultaneously inflated to provide a totally added inclined angle at, said 30 degrees.

When the body air cells 31A at odd rows of the air cell rows are inflated and the body air cells 31A at even rows of the air cell rows are deflated, the inclined air cell 20A at left side is also inflated to provide an inclined angle at, said 30 degrees.

The medical air mattress in accordance with the present invention has numerous advantages. With the guardrail sleeves 52 formed on the top of the upper bedspread 50, the mutual drawing-force between the guardrail sleeves 52 from 2-opposite side of the upper bedspread 50 holds the guardrail sleeves 52 in position to protect the patient lying on the medical air mattress. Furthermore, the body air cells 31A in conical shape associated with the inclined air cells 20A provide multiple inclined angles. Therefore, different patients may choose a proper inclined angle they need or as instructed by the doctor.

Even though numerous characteristics and advantages of the present invention have been set forth in the foregoing description, together with details of the structure and features of the invention, the above disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A medical air mattress comprising:

a lower bedspread having two sides, a front end, and a back end;

two inclined air cells positioned longitudinally on the lower bedspread and extending parallel to one another between the front end and the back end of the lower bedspread, and positioned respectively near the two sides of the lower bedspread;

a mattress body positioned across the inclined air cells, the mattress body comprising multiple body air cells and multiple head air cells parallel to each other and arranged in a row to form an air cell row, the head air cells are arranged at a head end in the air cell row, the body air cells and the head air cells are positioned non-parallel to the inclined air cells;

an upper bedspread covering the mattress body and connected to the lower bedspread and having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and, a pumping assembly to control inflating and deflating connected to and configured to selectively inflate the inclined air cells, the body air cells, the head air cells and the guardrail air cells independently from one another, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells, the guardrail pipeline is connected to a body alternating-valve such that air can only flow from the pump to the guardrail pipeline, the body alternating-valve is connected between the pump with the body pipeline and the guardrail pipeline, the multiple guardrail air cells are independently deflatable from the mattress body; and a rapidly releasing valve connected to the odd body pipeline and the even body pipeline.

2. The medical air mattress as claimed in claim 1, wherein each guardrail sleeve has two sleeve bodies formed separately and aligning with and coaxial to each other.

3. The medical air mattress as claimed in claim 2, wherein each body air cell and each head air cell are respectively uniform in diameter.

4. The medical air mattress as claimed in claim 2, wherein each body air cell gradually tapers in diameter from a wide end to a narrow end along the complete longitudinal length of the body air cell, and the body air cells are arranged with wide ends adjacent to the narrow ends.

5. The medical air mattress as claimed in claim 4, further comprising two offset air cells mounted longitudinally and mounted respectively on two sides of the mattress body.

6. The medical air mattress as claimed in claim 2, further comprising a massage unit mounted on the mattress body and having multiple micro vibrators.

7. The medical air mattress as claimed in claim 2, further comprising a heat unit made of carbon fiber electro thermal sheet and attached under-the upper bedspread.

8. The medical air mattress as claimed in claim 2, wherein the pumping assembly further comprises:

a guardrail solenoid valve connected between the guardrail pipeline and one or more structures selected from the group consisting of the body alternating valve and the even body pipeline; and a [third] check valve mounted between the guardrail solenoid valve and one or more structures selected from the group consisting of the body alternating valve and the even body pipeline.

9. The medical air mattress as claimed in claim 2, wherein the pumping assembly further comprises:

a manual alternating device connected between the guardrail pipeline and one or more structures selected from the group consisting of the body alternating valve and the even body pipeline; and a [third] check valve mounted between the manual alternating device and one or more structures selected from the group consisting of the body alternating valve and the even body pipeline.

10. The medical air mattress as claimed in claim 1, wherein each body air cell gradually tapers in diameter from a wide end to a narrow end along the complete longitudinal length of the body air cell, and the body air cells are arranged with wide ends adjacent to the narrow ends.

11. The medical air mattress as claimed in claim 1, the pumping assembly further comprising:

a manual alternating device connected between the guardrail pipeline and one or more structures selected from the group consisting of the body alternating valve and the even body pipeline; and a [third] check valve mounted between the manual alternating device and one or more structures selected from the group consisting of the body alternating valve and the even body pipeline.

12. The medical air mattress as claimed in claim 1, wherein a plurality of the air cells in the mattress body are conical shaped.

13. A medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row;

an upper bedspread covering the mattress body, connected securely to the lower bedspread and having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

a rapidly releasing valve connected to the odd body pipeline and the even body pipeline;

a guardrail solenoid valve connected between the guardrail pipeline and one or more structures selected from the group consisting of the body alternating valve and the even body pipeline; and a [third] check valve mounted between the guardrail solenoid valve and one or more structures selected from the group consisting of the body alternating valve and the even body pipeline.

14. A medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row;

an upper bedspread covering the mattress body, connected securely to the lower bedspread and having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

a rapidly releasing valve connected to the odd body pipeline and the even body pipeline;

an inclined solenoid valve connected to the pump; and an inclined alternating-valve connected between the inclined solenoid valve and the inclined pipeline.

15. A medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row;

an upper bedspread covering the mattress body, connected securely to the lower bedspread and having guardrail sleeves, respectively formed adjacent to the edges of two sides of the upper bedspread, each guardrail sleeve has two sleeve bodies formed separately and aligning with and coaxial to each other;

a guardrail unit mounted in the guardrail sleeves and comprising multiple guardrail air cells mounted respectively in the sleeve bodies of the guardrail sleeve; and, a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

a rapidly releasing valve connected to the odd body pipeline and the even body pipeline;

an inclined solenoid valve connected to the pump; and an inclined alternating-valve connected between the inclined solenoid valve and the inclined pipeline.

16. A medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row, each body air cell gradually tapers in diameter from a wide end to a narrow end, and the body air cells are arranged with wide ends adjacent to the narrow ends;

an upper bedspread covering the mattress body, connected securely to the lower bedspread and having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

a rapidly releasing valve connected to the odd body pipeline and the even body pipeline;

an inclined solenoid valve connected to the pump; and an inclined alternating-valve connected between the inclined solenoid valve and the inclined pipeline.

17. The medical air mattress as claimed in claim 16, wherein the pumping assembly further comprises:

a body alternating-valve connected between the pump with the body pipelines and the guardrail pipeline;

a first check valve connected between the odd body pipeline and the head air cells at odd rows of the air cell rows; and a second check valve connected between the even body pipeline and the head air cells at even rows of the air cell rows.

18. A medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row, each body air cell gradually tapers in diameter from a wide end to a narrow end, and the body air cells are arranged with wide ends adjacent to the narrow ends;

an upper bedspread covering the mattress body, connected securely to the lower bedspread and having guardrail sleeves, respectively formed adjacent to the edges of two sides of the upper bedspread, each guardrail sleeve has two sleeve bodies formed separately and aligning with and coaxial to each other;

a guardrail unit mounted in the guardrail sleeves and comprising multiple guardrail air cells mounted respectively in the sleeve bodies of the guardrail sleeve; and a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

a rapidly releasing valve connected to the odd body pipeline and the even body pipeline;

an inclined solenoid valve connected to the pump; and an inclined alternating-valve connected between the inclined solenoid valve and the inclined pipeline.

19. The medical air mattress as claimed in claim 18, wherein the pumping assembly further comprises:

a body alternating-valve connected between the pump with the body pipelines and the guardrail pipeline;

a first check valve connected between the odd body pipeline and the head air cells at odd rows of the air cell rows; and a second check valve connected between the even body pipeline and the head air cells at even rows of the air cell rows.

20. A method to tilt a patient lying on a medical air mattress, said medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row, each body air cell gradually tapers in diameter from a wide end to a narrow end, and the body air cells are arranged with wide ends adjacent to the narrow ends;

an upper bedspread covering the mattress body, connected securely to the lower bedspread and having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

a rapidly releasing valve connected to the odd body pipeline and the even body pipeline; and, wherein *the* patient is tilted at a first inclined angle to the right side by inflating the body air cells at odd rows of the air cell row and deflating the body air cells at even rows of the air cell row, or wherein the patient is tilted at the first inclined angle to the left side by inflating the body air cells at even rows of the air cell row and deflating the body air cells at odd rows of the air cell row.

21. A method to tilt a patient lying on a medical air mattress according to claim 20, wherein the patient is tilted at a [third] *second* inclined angle *by inflation of one of said inclined air cells*, the [third] *second inclined* angle is [greater than] *different from* the first [or the second] inclined angle.

22. A method to tilt a patient lying on a medical air mattress, said medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row;

an upper bedspread covering the mattress body, connected securely to the lower bedspread and having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells; and a rapidly releasing valve connected to the odd body pipeline and the even body pipeline; and, wherein the patient is tilted at a [second] *first* inclined angle to the right side by inflating the inclined air cells on the left side of the mattress body and deflating the inclined air cells on the right side of the mattress body, or wherein the patient is tilted at [a second] *the first* inclined angle to the left side by inflating the inclined air cells on the right side of the mattress body and deflating the inclined air cells on the left side of the mattress body.

23. The method as defined in claim 22, wherein said body air cells at even and at odd rows of the air cell row are all inflated.

24. A method to tilt a patient lying on a medical air mattress according to claim 22, wherein the patient is tilted at a [third] *second* inclined angle *by deflation of at least one of said body air cells*, the [third] *second inclined* angle is [greater than] *different from* the first [or the second] inclined angle.

25. A medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row;

an upper bedspread covering the mattress body, connected securely to the lower bedspread and having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and, a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

a rapidly releasing valve connected to the odd body pipeline and the even body pipeline;

the pumping assembly further comprises:

a body alternating valve connected between the pump with the body pipelines and the guardrail pipeline;

a first check valve connected between the odd body pipeline and the body air cells and the head air cells at odd rows of the air cell rows; and, a second check valve connected between the even body pipeline and body air cells and the head air cells at even rows of the air cell rows.

26. A medical air mattress comprising:

a lower bedspread having two sides, a front end, and a back end;

two inclined air cells positioned longitudinally on the lower bedspread and extending parallel to one another between the front end and the back end of the lower bedspread, and positioned respectively near the two sides of the lower bedspread;

a mattress body supported on its two sides by the inclined air cells, the mattress body comprising multiple body air cells and multiple head air cells parallel to each other and arranged in a row to form an air cell row, the body air cells and the head air cells extend uninterrupted a width of the mattress body, the head air cells are arranged at a head end in the air cell row, the body air cells and the head air cells are positioned non-parallel to the inclined air cells;

an upper bedspread covering the mattress body and connected to the lower bedspread, the connection of the upper bedspread covering to the lower bedspread forming a cavity that contains the mattress body and the inclined air cells, the upper bedspread having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and, a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

wherein the pumping assembly further comprises:

a body alternating valve connected between the pump with the body pipelines and the guardrail pipeline;

a guardrail solenoid valve connected between the guardrail pipeline and one or more structures selected from the group consisting of the body alternating valve and the even body pipeline;

a first check valve connected between the odd body pipeline and the body air cells and the head air cells at odd rows of the air cell rows;

a second check valve connected between the even body pipeline and body air cells and the head air cells at even rows of the air cell rows; and, a third check valve mounted between the guardrail solenoid valve and one or more structures selected from the group consisting of the body alternating valve and the even body pipeline.

27. The medical air mattress as claimed in claim 26, wherein the multiple guardrail air cells are independently deflatable from the mattress body, the guardrail pipeline is connected to the body alternating-valve such that air can only flow from the pump to the guardrail pipeline.

28. A medical air mattress comprising:

a lower bedspread;

two inclined air cells mounted longitudinally on the lower bedspread, respectively near two sides of the lower bedspread and parallel to each other;

a mattress body mounted on the lower bedspread, mounted across the inclined air cells and comprising multiple body air cells and multiple head air cells parallel to each other and arranged in a row to form an air cell row, wherein the head air cells are arranged at a head end in the air cell row;

an upper bedspread covering the mattress body, connected securely to the lower bedspread and having guardrail sleeves, respectively formed adjacent to the edges of two sides of the upper bedspread, each guardrail sleeve having at least one sleeve body;

a guardrail unit mounted in the guardrail sleeves and comprising multiple guardrail air cells mounted respectively in the sleeve bodies of the guardrail sleeve; and a pumping assembly to control inflating and deflating connected to and selectively inflating the inclined air cells, the body air cells, the head air cells and the guardrail air cells, the pumping assembly comprising:

a pump;

an inclined pipeline connecting the pump with the inclined air cells;

an odd body pipeline connecting the pump with the body air cells and the head air cells at odd rows of the air cell rows;

an even body pipeline connecting the pump with the body air cells and the head air cells at even rows of the air cell rows;

a guardrail pipeline connecting the pump with the guardrail air cells;

a rapidly releasing valve connected to the odd body pipeline and the even body pipeline;

a body alternating-valve connected between the pump with the body pipelines and the guardrail pipeline;

a first check valve connected between the odd body pipeline and the head air cells at odd rows of the air cell rows; and a second check valve connected between the even body pipeline and the head air cells at even rows of the air cell rows.

*29. A medical air mattress comprising:*

*a mattress body comprising multiple mattress air cells, each of said mattress air cells positioned parallel to one another and are oriented perpendicular to a longitudinal axis of said mattress body to form a plurality of air cell rows;*

*an upper bedspread that at least partially covers said mattress body, said upper bedspread including first and second guardrail sleeves positioned on an upper edge region of said upper bedspread, each of said guardrail sleeves having at least one sleeve body;*

*multiple guardrail air cells, at least one of said guardrail air cells at least partially positioned in said sleeve body of said first guardrail sleeve, at least one of said guardrail air cells at least partially positioned in said sleeve body of said second guardrail sleeve, at least one of said guardrail air cells is independently inflatable and/or deflatable from one or more of said mattress air cells; and*

*a pumping assembly to control inflation and/or deflation of said mattress air cells and said guardrail air cells, said pumping assembly comprising:*

*a pump;*

*an odd body pipeline connected between said pump and a plurality of said mattress air cells at odd rows of said air cell rows, said odd body pipeline configured to enable fluid to flow between said pump and said plurality of said mattress air cells at odd rows of said air cell rows;*

*an even body pipeline connected between said pump and a plurality of said mattress air cells at even rows of said air cell rows, said even body pipeline configured to enable fluid to flow between said pump and said plurality of said mattress air cells at even rows of said air cell rows; and,*

*a guardrail pipeline connected between said pump with at least one of said guardrail air cells, a valve connected between said pump and said guardrail pipeline, said valve configured to at least partially control air flow to said guardrail pipeline.*

*30. The medical air mattress as defined in claim 29, wherein said first side guardrail sleeve is positioned adjacent to an upper edge of said upper bedspread when said upper bedspread is positioned on said mattress body, said second side guardrail sleeve positioned adjacent to a different upper edge of said upper bedspread when said upper bedspread is positioned on said mattress body.*

*31. The medical air mattress as defined in claim 30, wherein said first side guardrail sleeve and said second side guardrail sleeve are positioned parallel to one another when said upper bedspread is positioned on said mattress body.*

*32. The medical air mattress as defined in claim 30, wherein said pumping assembly configured to control inflating, deflating, or a combination thereof of at least one of said guardrail air cells independently of inflating, deflating, or a combination thereof of a plurality of said mattress body air cells.*

*33. The medical air mattress as defined in claim 30, wherein said guardrail air cells are spaced from said mattress air cells.*

*34. The medical air mattress as defined in claim 30, wherein a plurality of said mattress air cells are uniform in diameter and extend uninterrupted a full width of said mattress body.*

*35. The medical air mattress as defined in claim 30, wherein a plurality of said mattress air cells are conical shaped and extend uninterrupted a full width of said mattress body.*

*36. The medical air mattress as defined in claim 30, wherein a plurality of said mattress air cells gradually taper in diameter from a wide end to a narrow end, and said mattress air cells are arranged with wide ends adjacent to said narrow ends.*

*37. The medical air mattress as defined in claim 29, wherein said first guardrail sleeve includes first and second sleeve sections that are spaced from one another and are aligned coaxial to each other, said second guardrail sleeve includes first and second sleeve sections that are spaced from one another and are aligned coaxial to each other.*

*38. The medical air mattress as defined in claim 29, wherein said pumping assembly is configured to independently control inflation, deflation, or a combination thereof of a plurality of said odd rows and a plurality of said even rows of said air cell rows of said mattress air cells.*

*39. The medical air mattress as defined in claim 29, wherein said pumping assembly configured to control inflating, deflating, or a combination thereof of at least one of said guardrail air cells independently of inflating, deflating, or a combination thereof of a plurality of said mattress body air cells.*

*40. The medical air mattress as defined in claim 29, wherein said guardrail air cells are spaced from said mattress air cells.*

*41. The medical air mattress as defined in claim 29, wherein a plurality of said mattress air cells are uniform in diameter and extend uninterrupted a full width of said mattress body.*

*42. The medical air mattress as defined in claim 29, wherein a plurality of said mattress air cells are conical shaped and extend uninterrupted a full width of said mattress body.*

*43. The medical air mattress as defined in claim 29, wherein a plurality of said mattress air cells gradually taper in diameter from a wide end to a narrow end, and said mattress air cells are arranged with wide ends adjacent to said narrow ends.*

*44. The medical air mattress as defined in claim 29, further comprising a massage unit mounted on the mattress body.*

*45. The medical air mattress as defined in claim 29, further comprising a heat unit.*

*46. A medical air mattress comprising:*

*a mattress body comprising multiple mattress air cells, each of said mattress air cells positioned parallel to one another and are oriented perpendicular to a longitudinal axis of said mattress body to form a plurality of air cell rows;*

*an upper bedspread that at least partially covers said mattress body, said upper bedspread including first and second guardrail sleeves positioned on an upper edge region of said upper bedspread, each of said guardrail sleeves having at least one sleeve body;*

*multiple guardrail air cells, at least one of said guardrail air cells at least partially positioned in said sleeve body of said first guardrail sleeve, at least one of said guardrail air cells at least partially positioned in said sleeve body of said second guardrail sleeve; and*

*a pumping assembly to control inflation and/or deflation of said mattress air cells and said guardrail air cells, said pumping assembly comprising:*

*a pump;*

*an odd body pipeline connected between said pump and a plurality of said mattress air cells at odd rows of said air cell rows, said odd body pipeline configured to enable fluid to flow between said pump and said plurality of said mattress air cells at odd rows of said air cell rows;*

*an even body pipeline connected between said pump and a plurality of said mattress air cells at even rows of said air cell rows, said even body pipeline configured to enable fluid to flow between said pump and said plurality of said mattress air cells at even rows of said air cell rows;*

*a guardrail pipeline connected between said pump and at least one of said guardrail air cells, said guardrail pipeline configured to enable fluid to flow between said pump and said at least one of said guardrail air cells;*

*a first check valve connected between said pump and a plurality of said mattress air cells at said odd rows of said air cell rows to control fluid flow from said pump through said odd body pipeline and to said plurality of said mattress air cells at odd rows of said air cell rows;*

*a second check valve connected between said pump and a plurality of said mattress air cells at even rows of said air cell rows to control fluid flow from said pump through said even body pipeline and to said plurality of said mattress air cells at even rows of said air cell rows; and,*

*a third check valve connected between said pump and at least one of said guardrail air cells to control fluid flow from said pump through said guardrail pipeline and to said at least one of said guardrail air cells.*

*47. A medical air mattress comprising:*

*a mattress body comprising multiple mattress air cells, each of said mattress air cells positioned parallel to one another and are oriented perpendicular to a longitudinal axis of said mattress body to form a plurality of air cell rows;*

*an upper bedspread that at least partially covers said mattress body, said upper bedspread including first and second guardrail sleeves positioned on an upper edge region of said upper bedspread, each of said guardrail sleeves having at least one sleeve body, said first side guardrail sleeve is positioned adjacent to an upper edge of said upper bedspread when said upper bedspread is positioned on said mattress body, said second side guardrail sleeve positioned adjacent to a different upper edge of said upper bedspread when said upper bedspread is positioned on said mattress body, said first side guardrail sleeve and said second side guardrail sleeve are positioned parallel to one another when said upper bedspread is positioned on said mattress body;*

*multiple guardrail air cells, at least one of said guardrail air cells at least partially positioned in said sleeve body of said first guardrail sleeve, at least one of said guardrail air cells at least partially positioned in said sleeve body of said second guardrail sleeve; and*

*a pumping assembly to control inflating, deflating, or a combination thereof of said mattress air cells and said guardrail air cells, said pumping assembly comprising:*

*a pump;*

*an odd body pipeline connected between said pump and a plurality of said mattress air cells at odd rows of said air cell rows, said odd body pipeline configured to enable fluid to flow between said pump and said plurality of said mattress air cells at odd rows of said air cell rows;*

*an even body pipeline connected between said pump and a plurality of said mattress air cells at even rows of said air cell rows, said even body pipeline configured to enable fluid to flow between said pump and said plurality of said mattress air cells at even rows of said air cell rows;*

*a guardrail pipeline connected between said pump and at least one of said guardrail air cells, said guardrail pipeline configured to enable fluid to flow between said pump and said at least one of said guardrail air cells;*

*a first check valve connected between said pump and a plurality of said mattress air cells at said odd rows of said air cell rows to control fluid flow from said pump through said odd body pipeline and to said plurality of said mattress air cells at odd rows of said air cell rows;*

*a second check valve connected between said pump and a plurality of said mattress air cells at even rows of said air cell rows to control fluid flow from said pump through said even body pipeline and to said plurality of said mattress air cells at even rows of said air cell rows; and,*

*a third check valve connected between said pump and at least one of said guardrail air cells to control fluid*

*flow from said pump through said guardrail pipeline and to said at least one of said guardrail air cells.*

*48. The medical air mattress as defined in claim 47, wherein said first guardrail sleeve includes first and second sleeve sections that are spaced from one another and are aligned coaxial to each other, said second guardrail sleeve includes first and second sleeve sections that are spaced from one another and are aligned coaxial to each other.*

*49. The medical air mattress as defined in claim 48, wherein said pumping assembly is configured to independently control inflation, deflation, or a combination thereof of a plurality of said odd rows and a plurality of said even rows of said air cell rows of said mattress air cells.*

*50. The medical air mattress as defined in claim 49, wherein said pumping assembly configured to control inflating, deflating or a combination thereof of at least one of said guardrail air cells independently of inflating, deflating, or a combination thereof of a plurality of said mattress body air cells.*

*51. The medical air mattress as defined in claim 50, wherein said guardrail air cells are spaced from said mattress air cells.*

*52. The medical air mattress as defined in claim 51, wherein a plurality of said mattress air cells are uniform in diameter and extend uninterrupted a full width of said mattress body.*

*53. The medical air mattress as defined in claim 52, wherein a plurality of said mattress air cells are conical shaped and extend uninterrupted a full width of said mattress body.*

*54. The medical air mattress as defined in claim 51, wherein a plurality of said mattress air cells gradually taper in diameter from a wide end to a narrow end, and said mattress air cells are arranged with wide ends adjacent to said narrow ends.*

*55. A medical air mattress comprising:*

*a mattress body comprising multiple mattress air cells, each of said mattress air cells positioned parallel to one another and are oriented perpendicular to a longitudinal axis of said mattress body to form a plurality of air cell rows;*

*an upper bedspread that at least partially covers said mattress body, said upper bedspread including first and second guardrail sleeves positioned on an upper edge region of said upper bedspread, each of said guardrail sleeves having at least one sleeve body;*

*multiple guardrail air cells, at least one of said guardrail air cells at least partially positioned in said sleeve body of said first guardrail sleeve, at least one of said guardrail air cells at least partially positioned in said sleeve body of said second guardrail sleeve, said first side guardrail sleeve is positioned adjacent to an upper edge of said upper bedspread when said upper bedspread is positioned on said mattress body, said second side guardrail sleeve positioned adjacent to a different upper edge of said upper bedspread when said upper bedspread is positioned on said mattress body; and*

*a pumping assembly to control inflating, deflating, or a combination thereof of said mattress air cells and said guardrail air cells, said pumping assembly is configured to independently control inflation, deflation, or a combination thereof of a plurality of said odd rows and a plurality of said even rows of said air cell rows of said mattress air cells, said pumping assembly comprising:*

*a pump;*

*an odd body pipeline connected between said pump and a plurality of said mattress air cells at odd rows of said air cell rows, said odd body pipeline configured to enable fluid to flow between said pump and said plurality of said mattress air cells at odd rows of said air cell rows;*

*an even body pipeline connected between said pump and a plurality of said mattress air cells at even rows of said air cell rows, said even body pipeline configured to enable fluid to flow between said pump and said plurality of said mattress air cells at even rows of said air cell rows;*

*a guardrail pipeline connected between said pump and at least one of said guardrail air cells, said guardrail pipeline configured to enable fluid to flow between said pump and said at least one of said guardrail air cells.*

*56. A medical air mattress comprising:*

*a mattress body comprising multiple body air cells positioned parallel to each other and each body air cell arranged in a row to form an air cell row;*

*an upper bedspread that at least partially covers said mattress body, said upper bedspread including a first guardrail sleeve that is positioned on an upper surface of said upper bedspread when said upper bedspread is positioned on said mattress body, said first guardrail sleeve having at least one sleeve body;*

*a guardrail unit comprising a first guardrail air cell, said first guardrail air cell being at least partially positioned in said sleeve body of said first guardrail sleeve; and,*

*a pumping assembly to control inflation and/or deflation of said body air cells and said first guardrail air cell, said first guardrail air cell is independently inflatable and/or deflatable from one or more of said body air cells, said pumping assembly comprising:*

*a pump;*

*a valve; and*

*a pipeline system including a guardrail pipeline, the pipeline system connected between i) said pump and said multiple body air cells and ii) said pump and said first guardrail air cell, said valve connected with said pipeline system between said pump and said first guardrail air cell, said valve configured to enable fluid to flow from said pump to a) said multiple body air cells and/or b) said guardrail pipeline.*

*57. The medical air mattress as defined in claim 56, wherein a body alternating-valve is connected between said pipeline system and said pump such that fluid can only flow from said pump to said first guardrail air cell.*

*58. The medical air mattress as defined in claim 56, wherein said pumping assembly is configured to independently deflate, inflate, or a combination thereof at least one of said first guardrail air cell from a plurality of said body air cells.*

*59. The medical air mattress as defined in claim 56, wherein said first guardrail sleeve has a straight shape.*

*60. The medical air mattress as defined in claim 56, wherein said first guardrail sleeve has two sleeve bodies formed separately from one another, said two sleeve bodies of said first guardrail sleeve being spaced from one another, and aligned with and coaxial to each other.*

*61. The medical air mattress as defined in claim 56, wherein each of said body air cells is uniform in diameter.*

*62. The medical air mattress as defined in claim 56, wherein each of said body air cells gradually tapers in diameter from a wide end to a narrow end, and said body air*

*cells that are adjacently positioned to one another are arranged with said wide end adjacent to said narrow end.*

*63. The medical air mattress as defined in claim 62, further comprising two offset air cells mounted along a longitudinal axis of said mattress body and mounted respectively on two sides of said mattress body.*

*64. The medical air mattress as defined in claim 63, wherein said pipeline system including:*

*an odd body pipeline connected between said pump and a plurality of said mattress air cells at odd rows of said air cell rows, said odd body pipeline configured to enable fluid to flow between said pump and said plurality of said mattress air cells at odd rows of said air cell rows; and*

*an even body pipeline connected between said pump and a plurality of said mattress air cells at even rows of said air cell rows, said even body pipeline configured to enable fluid to flow between said pump and said plurality of said mattress air cells at even rows of said air cell rows;*

*said pumping assembly further comprises at least one rapidly releasing valve connected to the pipeline system.*

*65. The medical air mattress as defined in claim 56, further comprising a massage unit mounted on said mattress body.*

*66. The medical air mattress as defined in claim 56, further comprising a heat unit.*

*67. The medical air mattress as defined in claim 56, wherein a plurality of said body air cells in said mattress body are conical shaped.*

*68. The medical air mattress of claim 56, wherein said valve is selected from a group consisting:*

*a body-alternating valve;*

*a guardrail solenoid valve;*

*a check valve; and*

*a combination of the above.*

*69. A medical air mattress comprising:*

*a mattress body comprising multiple body air cells positioned parallel to each other and each body air cell arranged in a row to form an air cell row;*

*an upper bedspread that at least partially covers said mattress body, said upper bedspread including a first guardrail sleeve that is positioned on an upper surface of said upper bedspread when said upper bedspread is positioned on said mattress body, said first guardrail sleeve having at least one sleeve body;*

*a guardrail unit comprising a first guardrail air cell, said first guardrail air cell being at least partially positioned in said sleeve body of said first guardrail sleeve; and,*

*a pumping assembly to control inflating, deflating, or a combination thereof of said body air cells and said first guardrail air cell, said pumping assembly comprising:*

*a pump;*

*a pipeline system connected between i) said pump and a plurality of said mattress air cells and ii) said pump and said first guardrail air cell, said pipeline system further including a valve connected between said pump and said pipeline system, said valve configured to enable fluid to flow a) between said pump and said plurality of said mattress air cells and b) between said pump and said first guardrail air cell, said pipeline system including an odd body pipeline connected between said pump and a plurality of said mattress air cells at odd rows of said air cell rows, said odd body pipeline configured to enable fluid to flow between said pump and said plurality of said mattress air cells at odd rows of said air cell rows; and an even body pipeline connected between said pump and a plurality of said mattress air cells at even rows of said air cell rows, said even body pipeline configured to enable fluid to flow between said pump and said plurality of said mattress air cells at even rows of said air cell rows;*

*a guardrail valve connected between said guardrail pipeline and one or more structures selected from the group consisting of said pump, a body alternating valve, said odd body pipeline, and said even body pipeline; and*

*a check valve mounted between said guardrail valve and one or more structures selected from the group consisting of said pump, a body alternating valve, said odd body pipeline, and said even body pipeline.*

*70. The medical air mattress as defined in claim 69, wherein said pumping assembly further including:*

*at least one rapidly releasing valve connected to said pipeline system.*

*71. A medical air mattress comprising:*

*a mattress body comprising multiple body air cells positioned parallel to each other and each body air cell arranged in a row to form an air cell row;*

*an upper bedspread that at least partially covers said mattress body, said upper bedspread including a first guardrail sleeve that is positioned on an upper surface of said upper bedspread when said upper bedspread is positioned on said mattress body, said first guardrail sleeve having at least one sleeve body;*

*a guardrail unit comprising a first guardrail air cell, said first guardrail air cell being at least partially positioned in said sleeve body of said first guardrail sleeve; and,*

*a pumping assembly to control inflating, deflating, or a combination thereof of said body air cells and said first guardrail air cell, said pumping assembly is configured to independently deflate, inflate, or a combination thereof at least one of said first guardrail air cell from a plurality of said body air cells, said pumping assembly comprising:*

*a pump;*

*a pipeline system connected between i) said pump and a plurality of said mattress air cells and ii) said pump and said first guardrail air cell, said pipeline system further including a valve connected between said pump and said pipeline system, said valve configured to enable fluid to flow a) between said pump and said plurality of said mattress air cells and b) between said pump and said first guardrail air cell, said pipeline system including an odd body pipeline connected between said pump and a plurality of said mattress air cells at odd rows of said air cell rows, said odd body pipeline configured to enable fluid to flow between said pump and said plurality of said mattress air cells at odd rows of said air cell rows; and an even body pipeline connected between said pump and a plurality of said mattress air cells at even rows of said air cell rows, said even body pipeline configured to enable fluid to flow between said pump and said plurality of said mattress air cells at even rows of said air cell rows;*

*a guardrail valve connected between said guardrail pipeline and one or more structures selected from the*

*group consisting of said pump, a body alternating valve, said odd body pipeline, and said even body pipeline; and*

*a check valve mounted between said guardrail valve and one or more structures selected from the group consisting of said pump, a body alternating valve, said odd body pipeline, and said even body pipeline.*

*72. The medical air mattress as defined in claim 71, wherein said guardrail valve includes a manual alternating device.*

*73. A medical air mattress comprising:*

*a mattress body comprising multiple body air cells positioned parallel to each other and each body air cell arranged in a row to form an air cell row;*

*an upper bedspread that at least partially covers said mattress body, said upper bedspread including a first guardrail sleeve that is positioned on an upper surface of said upper bedspread when said upper bedspread is positioned on said mattress body, said first guardrail sleeve having at least one sleeve body;*

*a guardrail unit comprising a first guardrail air cell, said first guardrail air cell being at least partially positioned in said sleeve body of said first guardrail sleeve; and,*

*a pumping assembly to control inflating, deflating, or a combination thereof of said body air cells and said first guardrail air cell, said pumping assembly comprising:*

*a pump;*

*a pipeline system connected between i) said pump and a plurality of said mattress air cells and ii) said pump and said first guardrail air cell, said pipeline system further including a valve connected between said pump and said pipeline system, said valve configured to enable fluid to flow a) between said pump and said plurality of said mattress air cells and b) between said pump and said first guardrail air cell, said pipe system including an odd body pipeline connected between said pump and a plurality of said mattress air cells at odd rows of said air cell rows, said odd body pipeline configured to enable fluid to flow between said pump and said plurality of said mattress air cells at odd rows of said air cell rows; and an even body pipeline connected between said pump and a plurality of said mattress air cells at even rows of said air cell rows, said even body pipeline configured to enable fluid to flow between said pump and said plurality of said mattress air cells at even rows of said air cell rows;*

*a body alternating-valve connected between said pump with at least one of said body pipelines and said guardrail pipeline;*

*a first check valve connected between said odd body pipeline and said body air cells at odd rows of said air cell rows; and*

*a second check valve connected between said even body pipeline and said body air cells at even rows of said air cell rows.*

*74. A medical air mattress comprising:*

*a mattress body comprising multiple body air cells positioned parallel to each other and each body air cell arranged in a row to form an air cell row;*

*an upper bedspread that at least partially covers said mattress body, said upper bedspread including a first guardrail sleeve that is positioned on an upper surface of said upper bedspread when said upper bedspread is positioned on said mattress body, said first guardrail sleeve having at least one sleeve body;*

*a guardrail unit comprising a first guardrail air cell, said first guardrail air cell being at least partially positioned in said sleeve body of said first guardrail sleeve; and,*

*a pumping assembly to control inflating, deflating, or a combination thereof of said body air cells and said first guardrail air cell, said pumping assembly comprising:*

*a pump;*

*a pipeline system connected between i) said pump and a plurality of said mattress air cells and ii) said pump and said first guardrail air cell, said pipeline system further including a valve connected between said pump and said pipeline system, said valve configured to enable fluid to flow a) between said pump and said plurality of said mattress air cells and b) between said pump and said first guardrail air cell, said pipeline system including an odd body pipeline connected between said pump and a plurality of said mattress air cells at odd rows of said air cell rows, said odd body pipeline configured to enable fluid to flow between said pump and said plurality of said mattress air cells at odd rows of said air cell rows; and an even body pipeline connected between said pump and a plurality of said mattress air cells at even rows of said air cell rows, said even body pipeline configured to enable fluid to flow between said pump and said plurality of said mattress air cells at even rows of said air cell rows;*

*a body alternating-valve connected between said pump with at least one of said body pipelines and said guardrail pipeline;*

*a guardrail valve connected between said guardrail pipeline and one or more structures selected from the group consisting of said pump, a body-alternating valve, said odd body pipeline, and said even body pipeline;*

*a first check valve connected between said odd body pipeline and said body air cells at odd rows of said air cell rows;*

*a second check valve connected between said even body pipeline and body air cells at even rows of said air cell rows; and,*

*a third check valve mounted between said guardrail valve and one or more structures selected from the group consisting of said pump, a body alternating-valve, said odd body pipeline, and said even body pipeline.*

*75. The medical air mattress as defined in claim 74, wherein said guardrail valve includes a manual alternating device.*

*76. A method to tilt a patient lying on a medical air mattress, said medical air mattress comprising:*

*a mattress body comprising multiple body air cells positioned parallel to each other and each body air cell arranged in a row to form an air cell row, a plurality of said body cells tapers in diameter from a wide end to a narrow end, a plurality of said body cells that are positioned adjacent to one another are arranged with said wide end adjacent to said narrow end; and,*

*a pumping assembly to control selective inflating, deflating, or combinations thereof of said body air cells, said pumping assembly comprising:*

*a pump;*

*an odd body pipeline connected between said pump and a plurality of said mattress air cells at odd rows of said air cell rows, said odd body pipeline configured to*

*enable fluid to flow between said pump and said plurality of said mattress air cells at odd rows of said air cell rows; and,*

*an even body pipeline connected between said pump and a plurality of said mattress air cells at even rows of said air cell rows, said even body pipeline configured to enable fluid to flow between said pump and said plurality of said mattress air cells at even rows of said air cell rows; and,*

*wherein the patient is tilted at a first inclined angle to a right side by inflating said body air cells at odd rows of said air cell row and deflating said body air cells at even rows of said air cell row, or*

*wherein the patient is tilted at the first inclined angle to a left side by inflating said body air cells at even rows of said air cell row and deflating said body air cells at odd rows of said air cell row.*

*77. The method as defined in claim 76, further comprising two inclined air cells mounted longitudinally and mounted respectively on two sides of said mattress body and positioned substantially parallel to one another, said two inclined air cells positioned beneath said mattress body,*

*wherein when said body air cells are all inflated, and one of said inclined air cells inflates and the other inclined air cell is not inflated to cause said mattress body to tilt, an inclination of a top surface of said mattress body is at a second inclined angle.*

*78. The method as defined in claim 77, wherein selected body air cells are inflated and other selected body air cells are deflated and when one of said inclined air cells inflates on a same side of said mattress body as said wide end of said inflated body air cells and the other inclined air cell is not inflated to cause said mattress body to tilt, an inclination of said top surface of said mattress body is at a third inclined angle, said third inclined angle is greater than said first or second inclined angle.*

*79. The method as defined in claim 76, wherein said medical mattress further comprises an upper bedspread including first and second guardrail sleeves respectively positioned on said upper bedspread, each of said first and second guardrail sleeves having at least one sleeve body, a guardrail unit including a plurality of guardrail air cells, at least one of said guardrail air cells at least partially mounted in each of said first and second guardrail sleeves, at least one of said guardrail air cells being independently inflatable, deflatable or a combination thereof from said a plurality of said body air cells.*

*80. A medical air mattress comprising:*

*a mattress body comprising multiple mattress air cells, each of said mattress air cells positioned parallel to one another and oriented perpendicular to a longitudinal axis of said mattress body to form a plurality of air cell rows;*

*an upper bedspread at least partially covering said mattress body;*

*at least two guardrail air cells, at least one of said guardrail air cells is independently inflatable and/or deflatable from one or more of said mattress air cells;*

*at least two guardrail sleeves connected to said upper bedspread by a guardrail sleeve connection arrangement, each of said guardrail sleeves configured to at least partially receive one or more said guardrail air cells;*

*a pumping assembly to control inflation and/or deflation of said mattress air cells and said guardrail air cells, said pumping assembly comprising:*

*a pump;*

*a valve; and,*

*a pipeline system including a guardrail pipeline, said pipeline system is connected between i) said pump and said multiple mattress air cells and ii) said pump and at least one of said guardrail air cells, said valve connected between said pump and at least a portion of said pipeline system, said valve configured to enable fluid to flow from said pump to a) said multiple mattress air cells and/or b) said guardrail pipeline.*

*81. The medical air mattress as defined in claim 80, wherein said each of said guardrail sleeves includes at least one sleeve body, said sleeve body of each of said guardrail sleeves configured to at least partially receive at least one of said guardrail air cells.*

*82. The medical air mattress of claim 80, wherein said valve is selected from a group consisting:*

*a body-alternating valve;*

*a guardrail solenoid valve;*

*a check valve; and*

*a combination of the above.*

* * * * *